Jan. 11, 1966    R. C. MILDNER    3,229,199
INTERFERENCE-FREE APPARATUS HAVING A PAIR OF REJECTION FILTERS
CONNECTED TO HOLLOW ELECTRODES FOR TESTING INSULATED
ELECTRICAL CONDUCTORS
Filed Oct. 18, 1961
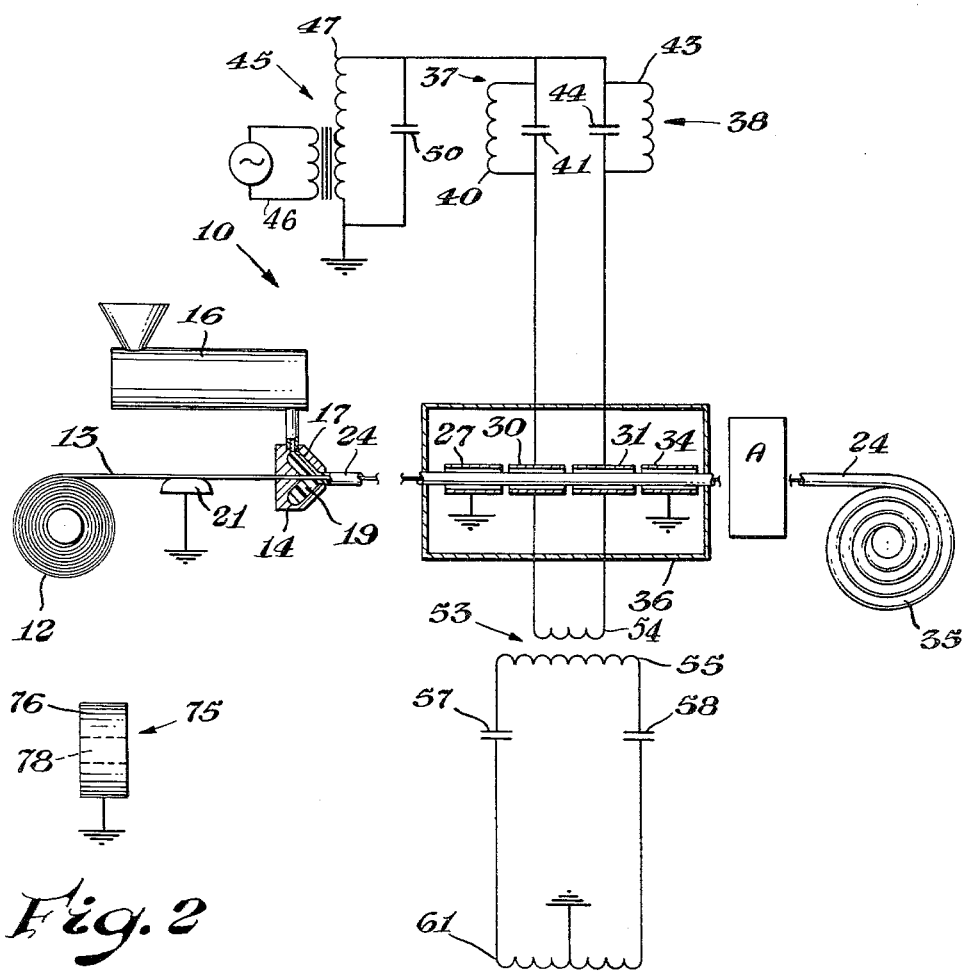
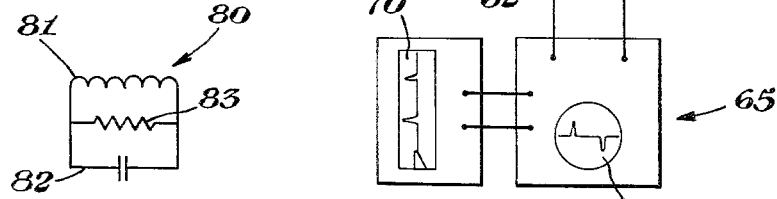
INVENTOR.
Raymond C. Mildner
BY
Robert B. Ingraham
AGENT

# United States Patent Office 3,229,199
Patented Jan. 11, 1966

3,229,199
INTERFERENCE-FREE APPARATUS HAVING A PAIR OF REJECTION FILTERS CONNECTED TO HOLLOW ELECTRODES FOR TESTING INSULATED ELECTRICAL CONDUCTORS
Raymond C. Mildner, Midland, Mich., assignor to The Dow Chemical Company, Midland, Mich., a corporation of Delaware
Filed Oct. 18, 1961, Ser. No. 145,874
4 Claims. (Cl. 324—54)

This invention relates to testing of insulated conductors. It more particularly relates to an improved method and apparatus for continuously testing insulated electrical conductors during the production thereof.

In the transmission of high voltage electrical energy, particularly where alternating current is employed, the uniformity of the conductor insulation is extremely important. Internal discharging within the conductor due to nonuniformity of the insulating covering frequently leads to premature failure under operating conditions. A number of methods of testing insulated conductors prior to acceptance by the customer have been employed in the past. Among them is the application of high voltage to a short section of an insulated conductor having a shield or screen disposed about the insulation or alternately the application of a high voltage to a long insulated conductor length. Such methods may detect failure or indicate potential insulation breakdown of a long length of insulated conductor or cable, but does little to pinpoint the precise location of the defect. Several techniques have been developed which permit the testing of relatively short portions of an extended length of insulated conductor. These techniques do not readily lend themselves to rapid and continuous evaluation of the product. The installation of high voltage conductors adapted to carry large currents is extremely expensive and any failure of the insulation or the cable usually results in economic hardship and laborious repair as well as other disadvantages arising from a failure of a power source.

It is an object of this invention to provide a method of continuously testing insulated conductors.

It is a further object of this invention to provide an improved method of detecting internal discharges within the conductor insulation.

It is a further object of this invention to provide an improved method of continuously testing insulated conductors by detecting internal discharges therein under the influences of a high voltage field which does not require extensive shielding of the instrumentation against electromagnetic fields.

It is another object of the invention to provide a method and apparatus for the continuous testing of an insulated conductor during its manufacture.

These benefits and other advantages are achieved by utilizing in operative association with conductor insulating equipment an apparatus for the continuous testing of a conductor disposed within an insulating layer, said apparatus comprising at least a pair of hollow electrodes adapted to pass the insulated conductor to be tested, each of said electrodes having electrically connected thereto a rejection filter to reject a frequency $f$, means to apply an alternating voltage of sufficient magnitude to cause internal discharge to occur in at least some voids in said insulating layer to said filter remote from said electrodes, said alternating current having a freqeuncy other than frequency $f$ and means to detect instantaneous potential differences between said electrodes.

The invention also contemplates a method of testing insulated conductors which comprises passing an insulated conductor to be tested within the field of a pair of electrodes surrounding the insulation, said electrodes being generally coaxially disposed with respect to said insulated conductor and being in axially spaced relationship, providing a relatively low resistance connection to said conductor, applying to said electrodes an alternating high voltage, said high voltage being sufficient to cause internal discharge in at least some voids in said cable insulation and detecting a resulting instantaneous voltage difference between said electrodes.

Further advantages of the invention will be apparent from the following specification and description taken in connection with the drawing wherein:

FIGURE 1 is a partly-in-section schematic representation of an apparatus in accordance with the invention.

FIGURES 2 and 3 represent alternate embodiments of noise and interference suppression devices which are employed in the practice of the invention.

In FIGURE 1 there is schematically represented a partly-in-section view of apparatus 10 for preparation of insulated conductors in accordance with the invention. A supply reel 12 supplies a conductor 13 to a wire coating die 14 of an extruder 16. The die 14 is provided with an internal passage 17 through which is supplied an insulating thermoplastic material 19. An electrical contact means 21 is in continuous electrical communication with the wire 13 prior to its coating with thermoplastic material 19. Issuing from the die 14 is an insulated conductor 24. The insulation is cooled by suitable means (not shown) and the insulated conductor passes through a shield electrode 27 and a pair of coaxially aligned generally cylindrical detector electrodes 30 and 31 and through a second shield electrode 34. The insulated conductor 24 passes through an optional processing zone, indicated by A, and is wound onto a reel 35. Beneficially, the electrodes 30 and 31 are immersed in a bath of insulating fluid 36. The electrodes 30 and 31 are supplied with a high voltage alternating current which passes through the band rejection filters 37 and 38. The rejection filter 37 comprises an inductive element 40 and a capacitive element 41. The rejection filter 38 comprises an inductive element 43 and a capacitive element 44. One of the terminals of each of the band rejection filters 37 and 38 are connected together and are supplied with a high voltage alternating current by a high voltage transformer 45. The high voltage transformer 45 comprises a low voltage primary winding 46 and a high voltage secondary winding 47. A damping capacitor 50 is connected in parallel with the high voltage secondary winding 47 to eliminate high frequency signals which might appear and also to limit transient peak voltages. The electrodes 30 and 31 are connected to opposite ends of the primary winding 54 of the tranfsormer 53. The transformer 53 is provided with a secondary winding 55. The ends of the winding 55 are each connected to one of the blocking capacitors 57 and 58. The side of the blocking capacitors 57 and 58 remote from a secondary winding 55 of transformer 53 are connected to opposite ends of the primary 61 of a transformer 60. The primary winding 61 of the transformer 60 is center tapped and the center tap is connected to ground. The transformer 60 is provided with a secondary winding 62 which is connected to a detector unit generally designated by the reference numeral 65. The detector unit 65 incorporates a band-pass filter tuned to the frequency $f$ (the rejection frequency of the traps 37 and 38) and an amplifier whose output is passed to suitable indicating means such as a cathode ray oscilloscope 67. Advantageously, a recording oscillograph 70 is optionally incorporated to provide a permanent record of discharges occurring within the insulation of the conductor.

FIGURE 2 depicts an alternate shield which is designated by the reference numeral 75, which may be employed to replace the shields 27 and 34. The shield 75 comprises a cylinder 76 defining a cylindrical opening 78 for the passage of the insulated conductor. The cylinder 76 is fabricated from soft iron or magnetic alloys such as "Alnico" and the like. Alternately the shields 27 and 34 may be replaced with a loaded or lossy tuned circuit 80 of FIGURE 3. The tuned circuit 80 comprises an inductor or coil 81, a capacitor 82, and a resistive element in parallel with the inductance 81 of the capacitor 82. The insulated conductor is passed through the coil 81 and the circuit is resonated at the detection frequency $f$.

Conventionally, in operation of the invention an insulated conductor is prepared in a conventional manner such as the extrusion of an insulating coating over a central conductive strand as it is set forth in FIGURE 1 wherein the conductive strand 13 is passed through the wire coating die 14 of the extruder 16; thermoplastic material 19 from the die 14 is coated onto the conductor 13 to form the insulated conductor 24. The conductor is provided with a continuous low resistance non-arcing connector 21 which maintains the conductor 13 at a ground potential. Following the extrusion the thermoplastic insulation is cooled by suitable conventional means such as liquid baths and most beneficially, air or other gas currents are used. The insulated conductor 24 passes through the shielding electrode 27 which served by means of its capacitance to the cable conductor 13 to provide a capacitive path to ground for undesired signals which are induced in the conductor prior to its entering the shield 27. The insulated conductor 24 then passes through the two detector electrodes 30 and 31 and subsequently through a second shield electrode 34 which operates in a manner similar to electrode 27 serving to bypass undesired signals which are induced in the conductor upon the windup reel 34 or in the zone designated A.

In operation, a low voltage alternating current is applied to the primary 46 of transformer 45, and a high voltage alternating current is induced in the secondary 47. High frequency transient voltages are bypassed to ground by the capacitor 50 and a generally sinusoidal voltage is applied to the rejection traps 37 and 38. Usually this alternating high voltage has a frequency of about 50 to 60 cycles per second. Higher and lower frequencies may be employed, but generally it is advantageous to utilize the readily available current supply equipment without frequency conversion. The rejection traps 37 and 38 are tuned to present a high impedance to the detector frequency which beneficially is a frequency different from the frequency of the test voltages and advantageously, higher frequencies such as about 400 kilocycles. The sinusoidal test voltage is simultaneously applied to the electrodes 30 and 31 whose capacity to the conductor 13 is constant if the insulation is constant; subsequently no current is induced in the primary 54 of the transformer 53. If a discontinuity or internal void appears within the insulation of the cable 24, a discharge will occur between the conductor and the inner surface of the insulated material. Thus, the capacity between the electrode 30 and the inner conductor 13 will be different from the capacity between the electrode 31 and the inner conductor 13 for the duration of the discharge (a very short period, less than a microsecond). The discharge occurring within the field of the capacitance 30 will cause a current to flow within the secondary 54 of the transformer 53. Beneficially, the electrodes are immersed in a non-conductor or liquid such as transformer oil to suppress discharges external to the isolated conductor. The internal discharge within the cable is a pulse which emits signals over a broad portion of the frequency spectrum. A portion of this signal is introduced into the primary 54 of the transformer 53, is transferred by mutual inductance to the secondary winding 55, and passes through the blocking capacitors 57 and 58 into the primary winding 61 into the transformer 60. The alternating current caused by the discharge within the cable appearing in the transformer winding 61 induces a current in the secondary 62 of the transformer 60 which in turn is fed to a band pass amplifier within the detector unit 65. The amplified signal is then passed to a suitable indicating means such as a cathode ray oscilloscope 67 and the recording oscillograph 70.

Thus, employing the present invention, small faults appearing in the insulation are readily detected and their particular location within the cable is easily determined. For example, if a discharge is indicated on the detector unit, the speed of extrusion is known and a signal from the detector through suitable conventional time delay mechanism may cause an indicating means such as a dye or paint to be applied to the insulation about the defective area. The function of the transformer 53 and the transformer 60 with the associated blocking capacitors 57 and 58 is to provide isolation of the detector from the high voltage A.C. appearing at the electrodes 30 and 31. The center tap in the primary 61 of the transformer 60 provides a path for current in case of failure of the blocking capacitors 57 and 58. If desired, greater selectivity is obtained if such transformers are tuned to the detection frequency.

The problem of interference such as may be caused from other arcing devices such as switch gear, motors and the like, as well as the electromagnetic radiation from radio transmitters, dielectric and induction heating apparatus is screened from the detector unit by shield electrodes 27 and 34. or alternately the embodiments 75 of FIGURE 2 and 80 of FIGURE 3. These shield electrodes prevent signals of large magnitude which may be induced on the insulated conductor 24, from entering a field of the indicator electrodes 30 and 31. If a balanced signal reaches this area, it is not transferred through transformer 53. Only signals causing unsymmetrical fields in these electrodes will cause a signal to be transmitted to the detector. Thus, the present system is substantially immune to external interference.

In a typical operation involving the preparation of an electrical cable the conductor 13 is unwound from the supply reel 12, the conductor comprises a 37 strand hard drawn copper core having a cross sectional area of copper of about 250,000 circular mils. The conductor 13 is connected to ground by means of a brush or electrical contact means 21 comprising a plurality of fingers in contact with the conductor. The stranded conductor is passed through the wire coating die 14 wherein an insulated sheath of polyethylene having an outside diameter of about 1 inch is extruded thereover. The polyethylene insulation is cooled below 40° centigrade in two cooling tanks at temperatures of 90° centigrade and 15° centigrade respectively. The surface of the insulation is then dried. The insulated conductor is then passed through the electrode assembly and immersed in a transformer grade of hydrocarbon oil. The shield electrode 27 comprises a brass cylinder about 3 inches in length and having an internal diameter of 1.080 inches, the brass electrode 27 is firmly connected to a ground bus. In spaced relationship and coaxial with the shield electrode 27 are the detector electrodes 30 and 31 which comprise 2 inch lengths of brass tube having an internal diameter of about 1.080 inches and spaced about one quarter of an inch apart. About three inches from the electrode 31 is positioned a shield electrode 34 having similar dimensions to the shield electrode 27. The shield electrode 34 is also connected to the ground bus. One hundred and ten volts 60 cycle current is applied to the primary of the transformer 45 resulting in a 14 kilovolt (R.M.S.) secondary voltage appearing at the common junction of the rejection filters 37 and 38 which are tuned to reject a band of frequencies from about 375 kilocycles per second to about 425 kilocycles per second. The untuned transformers 53 and 60 are suitably chosen to pass frequencies of 375–425 kilocycles. The blocking capacitors 57 and 58 conveniently have each a value of about 1,000 picofarads. Detector unit 65 incorporates an amplifier tuned to accept the band of frequencies rejected by the filters 37 and 43. After amplification and detection of the signal is readily displayed the cathode ray oscilloscope 67, a portion of the output rectified by an envelope detector and this rectified output fed to a recording oscillograph such as 70 of FIGURE 1.

Employing the apparatus of the invention, long lengths of insulated conductor are readily tested in a continuous manner as they are produced. Generally it is most advantageous to incorporate detection apparatus of the present invention in conjunction with the extruder, thus permitting the quality of the cable to be continuously monitored as it is prepared. Defective sections are readily and conveniently detected, subsequently they may be removed and the cable going to a final installation will be substantially flaw free. Alternately in the fabrication of more complicated forms of cable than is illustrated in FIGURE 1, the zone A may incorporate apparatus and means well known to the insulated conductor art for the addition of a screen or shield or similar conductive layer to the exterior of the first extruded cable and a second extrusion operation wherein a jacket is extruded over the shield or screen. By further increasing the complexity of the zone designated as A, shielded cables are readily fabricated and the insulation between the two shields or screens may be evaluated as is the quality of the first layer of insulation over the center conductor.

A plurality of testing devices in accordance with the present invention are advantageously employed if the characteristics of the insulation are to be determined at various voltages. For example, an insulated conductor is examined as is illustrated in FIGURE 1 at a voltage indicative of the insulation behaviour at normal operational voltages. A second installation of electrodes and associated circuitry are installed at the location designated as the optional processing zone A and operated at voltages which give indications of behaviour of the insulation under over voltage conditions such as those resulting from lightning, switching, and the like.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for the continuous testing of insulated conductors having a conductor disposed within an insulating layer, the apparatus comprising a pair of
   hollow electrodes adapted to pass the insulated conductor to be tested,
   a pair of rejection filters, each filter having an input terminal and output terminal, the rejection filters tuned to reject a frequency $f$,
   each of the output terminals of the rejection filters being connected to one of the hollow electrodes,
   the input terminals of the rejection filters being connected together to form a common junction,
   means to apply an alternating voltage of sufficient magnitude to cause internal discharge to occur in at least some voids in the insulating layer, the alternating voltage being applied to the common junction of the rejection filters,
   the alternating voltage having a frequency other than the frequency $f$,
   generally cylindrical grounded shields disposed on either side and coaxial with the pair of hollow electrodes,
   a detector coupled to the hollow electrodes the detector comprising a tuned amplifier and indicating means,
   the detector being tuned to the frequency $f$.

2. The apparatus of claim 1, wherein the hollow electrodes are transformer coupled to the detector.

3. The apparatus of claim 1, wherein said detector includes a recording oscillograph.

4. An apparatus of claim 1, wherein the detected output is displayed on a cathode ray oscilloscope screen.

References Cited by the Examiner

UNITED STATES PATENTS

| 2,189,395 | 2/1940 | Gray | 154—2.6 X |
| 2,460,107 | 1/1949 | Slade | 324—54 |
| 2,882,491 | 4/1959 | Gooding | 324—54 |
| 2,900,597 | 8/1959 | Gooding | 324—54 |
| 3,015,774 | 1/1962 | Eigen | 324—54 |
| 3,047,799 | 7/1962 | Peer et al. | 324—54 |

FOREIGN PATENTS 545,916   10/1957   Canada.

WALTER L. CARLSON, *Primary Examiner*.